United States Patent [19]

Daniel et al.

[11] 4,286,268

[45] Aug. 25, 1981

[54] ADAPTIVE ARRAY WITH OPTIMAL SEQUENTIAL GRADIENT CONTROL

[75] Inventors: Sam M. Daniel, Tempe; Michael H. Myers, Scottsdale, both of Ariz.

[73] Assignee: Motorola Inc., Schaumburg, Ill.

[21] Appl. No.: 29,805

[22] Filed: Apr. 13, 1979

[51] Int. Cl.³ .............................................. H04B 1/10

[52] U.S. Cl. .............................................. 343/100 LE

[58] Field of Search .................................. 343/100 LE

[56] References Cited

U.S. PATENT DOCUMENTS

| | | | |
|---|---|---|---|
| 3,987,444 | 10/1976 | Masak et al. | 343/100 LE |
| 4,119,962 | 10/1978 | Lewis | 343/100 LE X |
| 4,170,755 | 10/1979 | Masak et al. | 343/100 LE |
| 4,173,759 | 11/1979 | Bakhru | 343/100 LE |

*Primary Examiner*—T. H. Tubbesing
*Attorney, Agent, or Firm*—Eugene A. Parsons

[57] ABSTRACT

An adaptive antenna array including a main antenna and at least one auxiliary antenna with a plurality of weight adjusting channels and circuitry for adjusting the gain of each channel periodically switched into each channel, and each channel further including memory means for continued gradient control during period that the circuit is connected to other channels.

7 Claims, 3 Drawing Figures

ADAPTIVE ARRAY WITH OPTIMAL SEQUENTIAL GRADIENT CONTROL

BACKGROUND OF THE INVENTION

The present invention pertains to adaptive antenna arrays and especially to adaptive antenna arrays using the steepest descent algorithm, as disclosed in copending application filed Mar. 22, 1979, Ser. No. 22,663, entitled "STEEPEST DESCENT CONTROLLER FOR AN ADAPTIVE ANTENNA ARRAY", bearing Motorola docket number GE-79677. In general, all prior art adaptive array apparatus has had the form of a parallel process in the sense that all adjustable weight parameters are driven by means of dedicated, similar and simultaneous gradient controlling components. The traditional parallel system requires duplication of associated hardware resulting in additional size and cost. While it is believed that some effort has been made to minimize duplication of associated hardware through timesharing control elements, the general impression among those skilled in the field of adaptive array processing is that sequential gradient control is an impractical adaptive array technique because of its slower convergence.

SUMMARY OF THE INVENTION

The present invention pertains to an adaptive antenna array having a main antenna and at least one auxiliary antenna with apparatus for sequential gradient control connected thereto including a plurality of channels for adjusting the weight of signals from the auxiliary antenna, gain control circuitry for adjusting the gain of each channel, and switches connected to periodically connect the gain control circuitry to each of the channels with each of said channels including a memory for continued gradient control during periods that the gain control circuitry is connected to other channels.

It is an object of the present invention to provide new and improved sequential gradient control for an adaptive antenna array.

It is a further object of the present invention to provide sequential gradient control for an adaptive antenna array including a memory for improving stability and convergence rate.

These and other objects of this invention will become apparent to those skilled in the art upon consideration of the accompanying specification, claims and drawings.

BRIEF DESCRIPTION OF THE DRAWINGS

Referring to the drawings.

DESCRIPTION OF THE PREFERRED EMBODIMENTS

Figure 1:
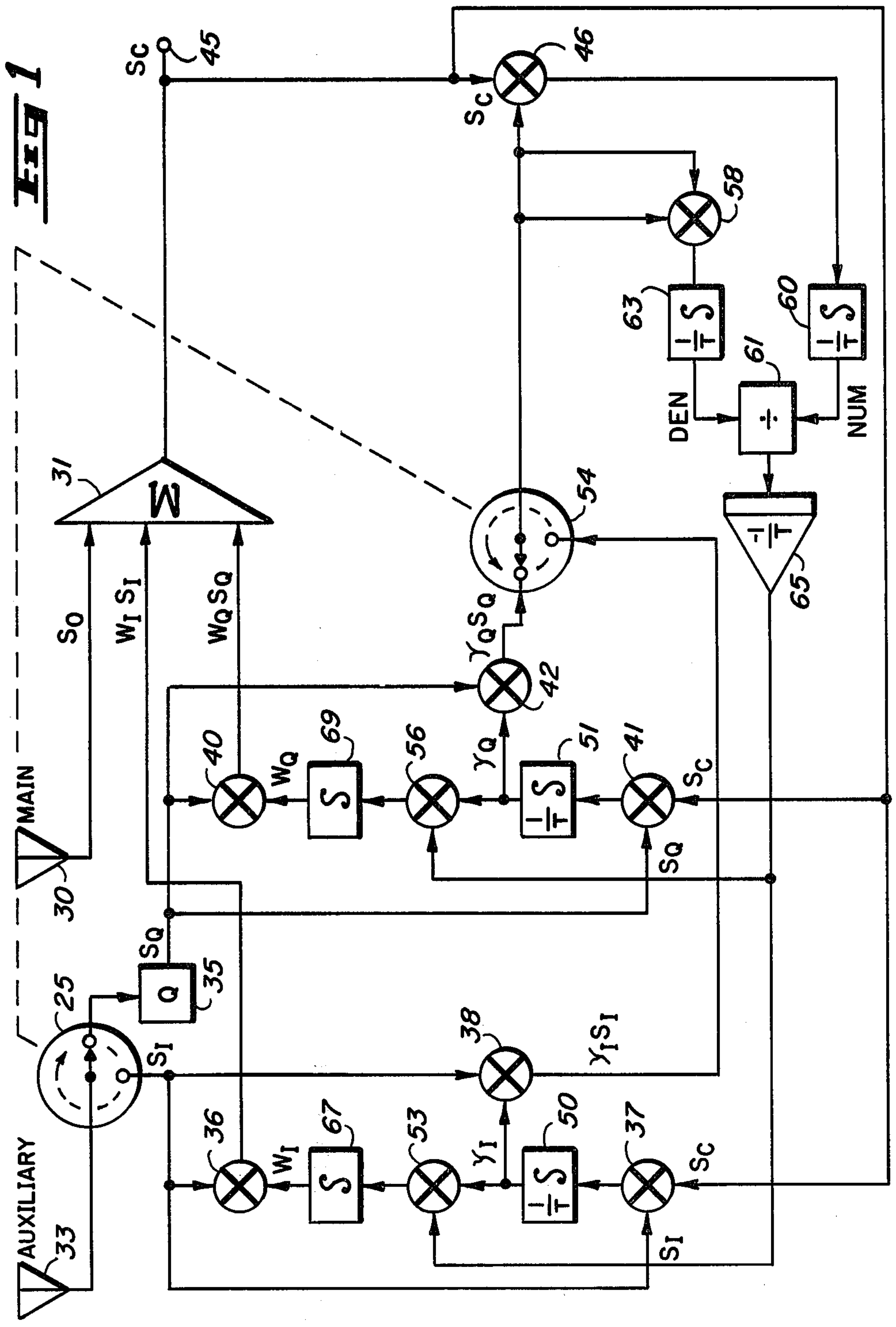
FIG. 1 is a block diagram of an adaptive antenna array embodying the present invention.

Referring specifically to FIG. 1, a main directional antenna 30 is coupled to one input of a summing device 31. An auxiliary antenna 33 is connected to the rotary contact of a switch 25. One output terminal of the switch 25 is connected through a 90° phase shifting device 35 to inputs of three multipliers 40, 41 and 42. A second output terminal of the switch 25 is connected to the inputs of three multipliers 36, 37 and 38. The multipliers 36 and 40 operate as variable weighting circuits and multiply the components of the auxiliary antenna signal by corresponding weights generated and stored in integrators 67 and 69. The outputs of the multipliers 36 and 40 are applied to two inputs of the summing circuit 31. The output of the summing circuit 31 is applied to an output terminal 45 which operates as an output for the system and is also applied to an input of a multiplier 46 as well as inputs of the multipliers 37 and 41. The multipliers 37 and 41 multiply inphase and quadrature components of the auxiliary signal by the composite output signal of the summing circuit 31. The outputs of the multipliers 37 and 41 are each applied through circuits 50 and 51, respectively, which are low pass filters that substantially integrate the signals and multiply by a factor 1/T, to provide output signals representative of the inphase and quadrature gradient vector components. The circuits 50 and 51 may be mechanized, for example, by means of an RC filter with bandwidth of 1/T. Also, while an analog embodiment is illustrated, the filters could be digital or a moving window average. In any case the filters operate as a memory or, in some embodiments, a memory might be incorporated in some of the other components or added in addition to the described components.

The inphase gradient vector signal is applied to a second input of the multiplier 38 and to an input of another multiplier 53. The output of the multiplier 38 is applied to one terminal of a periodically rotating switch 54, which may be similar to and is in synchronism with the periodically rotating switch 25. The quadrature gradient vector component signal is applied to a second input of the multiplier 42 and to an input of another multiplier 56. The output of the multiplier 42 is applied to a second terminal of the periodically rotating switch 54. The rotating contact of the switch 54 is connected to a second input of the multiplier 46 and to both inputs of a multiplier 58 so that the output thereof is the square of the input. The output of the multiplier 46 is applied through a circuit 60 which integrates the signal and multiplies by a factor 1/T. The output of the circuit 60 is applied to a dividing circuit 61 as the numerator. The output of the multiplier 58 is applied through a circuit 63, similar to the circuit 60, the output of which is applied to the dividing circuit 61 as the denominator. The output of the dividing circuit 61 is the optimal gain of the system.

The optimal gain signal from the dividing circuit 61 is applied through an amplifying circuit 65, which applies a multication factor of -1/T, to the second inputs of the multipliers 53 and 56. The output of the multiplier 53 is integrated in the circuit 67 and applied as the inphase weighting vector component to the multiplier 36. The output of the multiplier 56 is integrated in the circuit 69 and applied as the quadrature weighting vector to the multiplier 40. The multipliers 36 and 40 multiply the inphase and quadrature components of the auxiliary antenna signal by the inphase and quadrature weighting vector components to produce the desired nulling of the interference signal. While specific components have been illustrated and specific titles have been utilized to indicate the operation of these components, it will be understood by those skilled in the art that these terms and components indicate generally the desired result and any circuit or component which can perform the desired result may be utilized therein.

The circuitry disclosed utilizes the steepest descent algorithm in gradient control in a process which can be called steepest descent optimal gradient control, and the detailed gradient controlling operation of the circuitry is disclosed in the above described copending application, which application is incorporated herein by reference. In the operation of the sequential gradient control, the switches 25 and 54 are connected so that they operate together and periodically connect the inphase and quadrature channels to the circuitry for adjusting the gain of the channels. The switches 25 and 54 are, preferably, electronic switches which are capable of operating at relatively high frequencies and the inphase and quadrature channels are connected to the gain circuitry at least once every 1/T. While a slightly longer period for updating the channels might be selected, such longer period is believed to diminish the convergence rate. It should be noted that the use of sequential gradient control in a system having a single auxiliary antenna with inphase and quadrature channels does not substantially reduce the number of components required, but this sequential gradient control system is illustrated to show the operation thereof in conjunction with such a simplified system. The reduction in components will become apparent in the description of the system of FIG. 2 set forth below.

Figure 3:
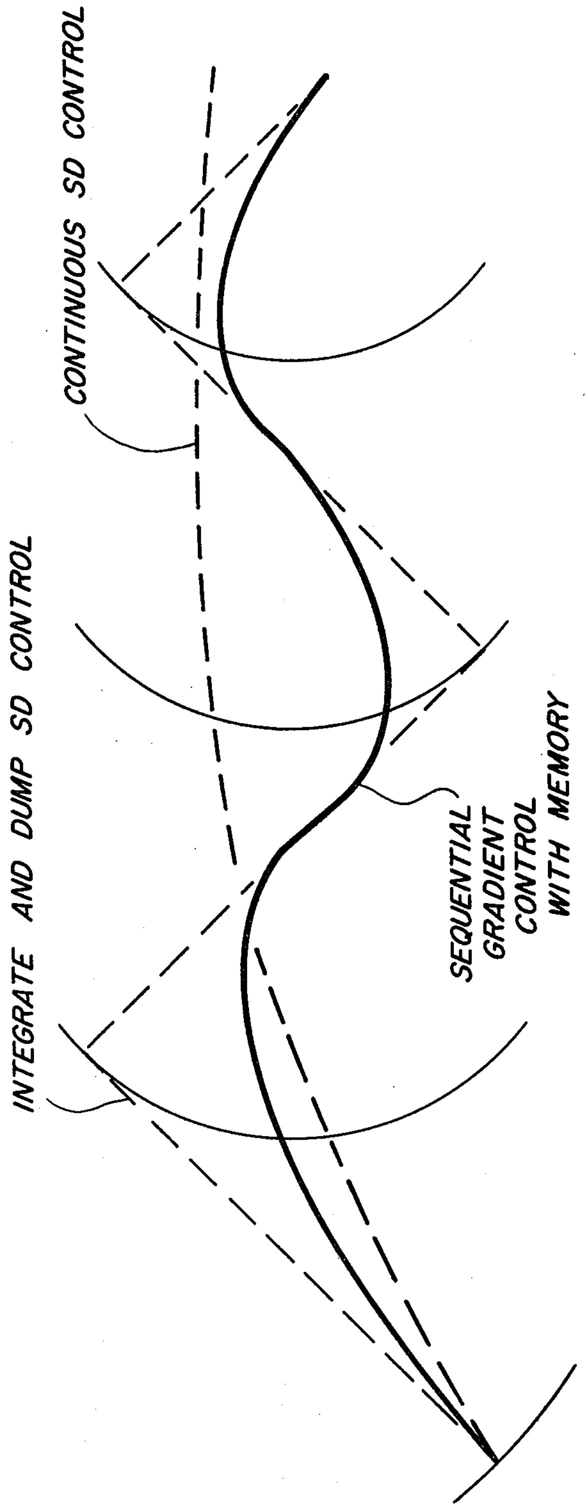
FIG. 3 is a contour map illustrating the improved convergence.

Each of the inphase and quadrature channels includes memory means, which in this embodiment is the RC filters 50 and 51. The switch 25 disconnects the auxiliary antenna 33 from one of the channels, for example the inphase channel, so that one of the inputs to the multiplier 37 is zero and, consequently, the output thereof is zero. The RC filter 50 thus retains its previous value and begins to exponentially decay. Simultaneously, the auxiliary antenna 33 is connected to the quadrature channel so that the RC filter 51 is updated, subsequent to some exponential decay. Meanwhile, the switch 54 connects the correct channel to the gain control circuit (through multiplying circuits 46 and 58) to adjust the gain toward the correct value. By supplying the memory means in each of the channels, the channels continue to drive toward the ultimate convergence while the antenna is disconnected from the channel. Referring to FIG. 3, typical steps in gradient control of the system disclosed in the copending application are illustrated in dotted lines while the gradient control for the present system is generally indicated by the solid lines. It will be noted that the exponential decay of the filters 50 and 51 tends to reduce the path length toward convergence, thereby providing more rapid convergence while maintaining a stable system. It will of course be understood by those skilled in the art that the memory means in each of the channels could be circuitry other than the RC filters 50 and 51 and might have decay characteristics which are other than exponential.

Figure 2:
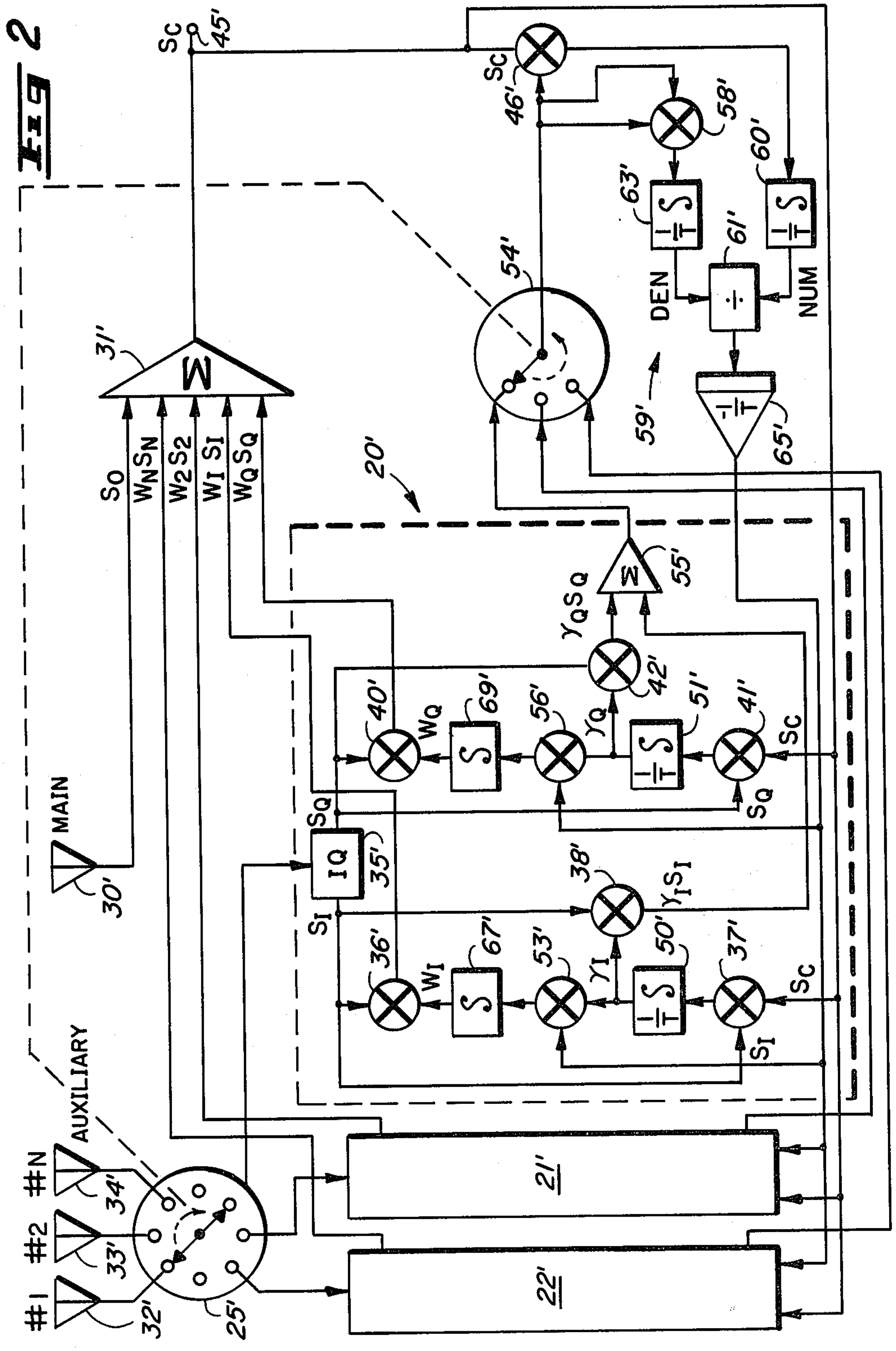
FIG. 2 is a block diagram of another embodiment of an adaptive antenna array embodying the present invention.

Referring specifically to FIG. 2, an embodiment is illustrated wherein the signal from each antenna is divided into in phase and quadrature components with only one controller being shown in detail. Because the various parts of the controller of FIG. 2 are similar to the controller of FIG. 1, like parts are designated with like numbers and all of the numbers have a prime added to indicate that it is a different embodiment. In the system of FIG. 2 a plurality of auxiliary antennas (N) designated 32′, 33′ and 34′ are periodically connected to an associated controller 20′, 21′ and 22′, respectively, by means of a switch 25′. The outputs of the controllers 20′, 21′ and 22′ are all connected to a summation device 31′ which produces an output signal at an output terminal 45′. The controllers 20′, 21′ and 22′ are also periodically connected by means of a switch 54′ to a circuit, generally designated as 59′ for adjusting the gain of each of the controllers 20′, 21′ and 22′. This particular embodiment differs from the embodiment illustrated in FIG. 1 in that the outputs of the inphase and quadrature channels for each of the controllers are summed in a summing device (device 55′ for controller 20′) prior to being applied to the switch 54′. Further, the signal from the antenna is applied through a phase splitting device 35′ from the switch 25′, rather than to each of the inphase and quadrature channels separately. It should be noted that the contacts of the switches 25′ and 54′ might be doubled and the inphase and quadrature channels for each of the controllers might be treated as a separate channel (as described in conjunction with FIG. 1), rather than treating each of the controllers as a separate channel. In all other respects the operation of the embodiment illustrated in FIG. 2 is similar to that of FIG. 1.

Thus, two embodiments of the present invention are illustrated and many other embodiments and innovations will be apparent to those skilled in the art. Both of these embodiments illustrate a plurality of weight channels and part of the apparatus being timeshared by each of the channels, with the channels continually driving the weights even when the timeshared apparatus is not connected thereto. While specific apparatus has been designated as part of the channel and specific apparatus has been designated as timeshared in the present embodiment, it will of course be understood by those skilled in the art that additional portions of the system might be timeshared by changing the position of the switches and/or adding additional switches.

While we have shown and described specific embodiments of this invention, further modifications and improvements will occur to those skilled in the art. We desire it to be understood, therefore, that this invention is not limited to the particular form shown and we intend in the appended claims to cover all modifications which do not depart from the spirit and scope of this invention.

We claim:

1. In an adaptive antenna array having a main antenna and at least one auxiliary antenna, apparatus for sequential gradient control comprising:

(a) a plurality of weight channels for adjusting the weight of signals from the auxiliary antenna to reduce side lobe interference;

(b) circuit means for adjusting the gain of each channel for gradient control of the weight;

(c) switching means connected to said weight channels and said circuit means for periodically connecting said circuit means to each of said weight channels; and (d) each of said weight channels including memory means for continued gradient control during periods that said circuit means is connected to other weight channels.

2. Apparatus for sequential gradient control as claimed in claim 1 wherein the memory means includes an RC filter.

3. Apparatus for sequential gradient control as claimed in claim 2 wherein the switching means includes a means for connecting the circuit means to each weight channel at a frequency at least equal to once per RC time constant of the RC filter of the weight channel.

4. Apparatus for sequential gradient control as claimed in claim 1 wherein the circuit means in conjunction with each weight channel embody steepest descent optimal gradient control.

5. Apparatus for sequential gradient control as claimed in claim 1 wherein the weight channels include an in-phase and quadrature channel for each auxiliary antenna.

6. Apparatus for sequential gradient control as claimed in claim 1 wherein the switching means includes a means for periodically connecting the circuit means to each weight channel and also includes a means for simultaneously connecting the correct auxiliary antenna to the associated weight channel.

7. Apparatus for sequential gradient control as claimed in claim 1 wherein the memory means in each channel is constructed with components having exponentially decaying memory.

* * * * *